United States Patent [19]

Wagner

[11] Patent Number: 5,501,511
[45] Date of Patent: Mar. 26, 1996

[54] TWO WHEELED VEHICLE WITH A PRESSURE ACTUATED COUPLER BETWEEN EACH ACTUATOR AND WHEEL BRAKE

[75] Inventor: Arnold Wagner, Winterthur, Switzerland

[73] Assignee: Peraves Ltd., Winterthur, Switzerland

[21] Appl. No.: 256,815

[22] PCT Filed: Nov. 16, 1993

[86] PCT No.: PCT/CH93/00261

§ 371 Date: Jul. 25, 1994

§ 102(e) Date: Jul. 25, 1994

[87] PCT Pub. No.: WO94/12374

PCT Pub. Date: Jun. 9, 1994

[30] Foreign Application Priority Data

Nov. 28, 1992 [CH] Switzerland ............... 03655/92

[51] Int. Cl.[6] .................. B60T 7/02; B62L 3/00
[52] U.S. Cl. ............. 303/9.64; 303/9.61; 303/113.5
[58] Field of Search ............... 303/9.61, 9.64, 303/9.65, 9.75, 9.76, 113.5, 115.6; 188/106 P, 344

[56] References Cited

U.S. PATENT DOCUMENTS

| 4,174,867 | 11/1979 | Oberthür | 303/9.64 |
| 4,176,886 | 12/1979 | Watanabe | 303/9.64 |
| 4,440,452 | 4/1984 | Burckhardt | 303/9.64 |
| 4,598,954 | 7/1986 | Hayashi | 303/9.61 |
| 4,626,042 | 12/1986 | Burckhardt | 303/9.64 X |

FOREIGN PATENT DOCUMENTS

| 2441521 | 6/1980 | France . | |
| 699847 | 8/1981 | Japan | 188/344 |
| 1257349 | 11/1986 | Japan . | |

*Primary Examiner*—Josie A. Ballato
*Attorney, Agent, or Firm*—Townsend and Townsend and Crew

[57] ABSTRACT

The fluid front wheel and rear wheel brake systems (12, 13) of the single-track vehicle are mechanically interconnected by way of a coupler (5), are isolated from one another fluidly and each is connected to a respective actuator (14, 15). The brake systems (12, 13) can be operated together with one of the actuators (15) by way of the coupler (5). In the event of a defect the brake systems remain isolated from one another and usable individually by way of the associated actuator.

10 Claims, 1 Drawing Sheet

TWO WHEELED VEHICLE WITH A PRESSURE ACTUATED COUPLER BETWEEN EACH ACTUATOR AND WHEEL BRAKE

BACKGROUND OF THE INVENTION

The invention relates to a fluid interlinked brake for single-track vehicles which has two brake systems associated with respective front and rear wheels, each comprising at least one brake unit and two independent actuators, one connected to each of the brake systems; and to a single-track vehicle having such a brake.

The brakes of single-track road vehicles must have two systems available, each of which acts to ensure the required security against failure even when the other fails. As a rule, at least one manually operated front wheel brake and a foot-operated rear wheel brake independent of the front wheel brake are provided. Because of the ratio of wheel base to height of center of gravity in conventional single-track vehicles, up to 100% of the total weight shifts onto the front wheel in a severe brake application. When the front wheel is locked by braking, the vehicle immediately loses its dynamic stability and unless the locking ceases rapidly the vehicle falls over. Consequently, brake applications near the maximum coefficient of friction must not overbrake the front wheel before the rear wheel. Optimal graduation of the braking force by the driver by means of the hand brake and foot brake of conventional single-track vehicles is very difficult and at times is virtually impossible because of the total weight shift and the resulting alteration in braking force distribution for minimal braking distance and, more particularly in the light of variable coefficients of friction of the road, for example, because of differences in road surfaces, wetness, dirt, oil, frost and so on. A choice must be made between overlong braking distances or the risk of falling. Because of graduation problems it has so far proved impossible to use braking force amplifiers.

Various interlinked brake devices are known. Because of the forward displacement of vehicle weight which occurs in braking, many vehicles have one or two front wheel brakes and a single rear wheel brake. In a partially interlinked brake device known since 1925 a front wheel brake and a rear wheel brake can be operated mechanically by the brake pedal and failure protection is provided by manual operation of the second front wheel brake. Corresponding hydraulic, partially interlinked devices have been known since about 1970 which are adapted to individual vehicle characteristics to some extent by differences in brake disc diameter and/or brake caliper transmission ratios.

SUMMARY OF THE INVENTION

It is an object of the invention to provide a brake device which is simple to operate, meets failure protection requirements, obviates the risk of overbraking of the front wheel and which helps to minimize braking distances without making great demands on driver skill. This is achieved in accordance with the present invention by connecting two brake systems to the actuators by way of a coupler having two pressure medium ducts which are isolated from one another and which can be connected one to each of the brake systems and the associated actuator. A moving connecting part is further provided which is actuatable by way of the pressure medium ducts and by way of which the same can be interconnected mechanically so that both brake systems can be actuated with one of the actuators.

The construction according to the invention facilitates an automatic distribution of forces between the front and rear brake systems by the operation of a single control element, e.g. a brake pedal, which can be coupled with simple connections to the brake units—at least one front wheel brake and a rear wheel brake. Failure protection—i.e., independent operation in the event of failure of one of the brake systems—is afforded by the coupler of the invention, which isolates the front system from the rear system fluid-wise and simultaneously produces a mechanical connection.

According to a feature of the invention the coupler can comprise a control element, e.g. in the form of a pressure-distributing spring, providing automatic adaptation of the braking forces.

BRIEF DESCRIPTION OF THE DRAWINGS

The invention will be described in greater detail hereinafter with reference to an embodiment which is shown diagrammatically in the drawings wherein.

DESCRIPTION OF THE PREFERRED EMBODIMENTS

Figure 1:
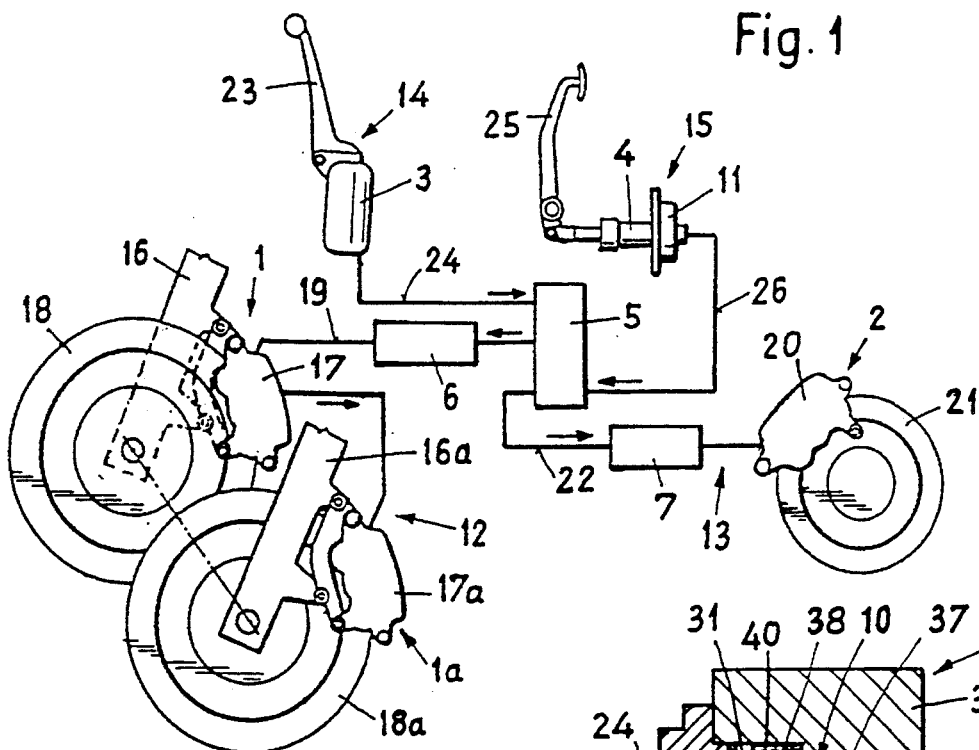
FIG. 1 shows a brake device according to the invention with parts of a single-track vehicle.

A brake device shown in FIG. 1, which is a fluid brake device—a hydraulic brake device in the example shown—comprises: a front brake system 12 associated with the front wheels (not shown) of a single-track vehicle; a brake system 13 associated with a rear wheel (not shown); and two actuators 14, 15 connected by way of a common coupler 5 to the systems 12, 13. The system 12 can comprise one or, as shown, two front wheel brakes 1, 1a having brake units 17, 17a, respectively, disposed on a part 16 of the vehicle and respective brake discs 18, 18a connected to the front wheel. The units 17, 17a are connected by way of a brake line 19 to the coupler 5. The brake system 13 comprises a rear wheel brake 2 having a brake unit 20 secured to the vehicle and a brake disc 21 connected to the rear wheel. Unit 20 is connected by way of a brake line 22 to the coupler 5. In another embodiment brake drums can be used instead of brake discs.

The actuator 14 comprises a hand brake cylinder 3 which can be operated with a hand lever 23 and which is connected by way of a pressure medium line 24 to the coupler 5. The actuator 15 comprises a foot brake cylinder 4 which can be operated with a brake pedal 25 which, as can be seen in the drawings, can have a braking force amplifier 11 and which is connected by way of a pressure medium line 26 to the coupler 5. At least one and, in the drawings, each of the two brake lines 19, 22 can have an anti-locking device 6, 7, respectively.

Figure 2:
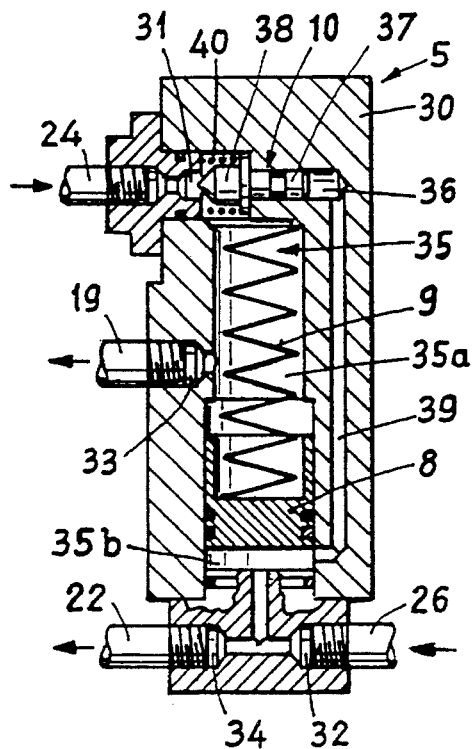
FIG. 2 is a view in longitudinal section of a detail of the brake device of FIG. 1.

Referring to FIG. 2, the coupler 5 can be in the form of a valve with a body 30 having two inputs 31, 32 connectable to one each of the respective pressure lines 24, 26, two outputs 33, 34 connectable to one each of the respective brake lines 19, 22, and a central bore 35. The same is subdivided by a moving connecting member—a sealingly guided isolating piston 8 in the drawings—into two pressure medium chambers 35a, 35b which are isolated from one another fluid-wise and which respectively connect the brake line 19 of the front system 12 to the pressure medium line 24 and the brake line 22 of the rear system 13 to the pressure medium line 26. Instead of an isolating piston some other connecting element such as a diaphragm can be provided. According to another feature (not shown) the line 24 can be connected to the line 22 and the line 26 can be connected to the line 19 for manually operated interlinked brakes, for example, in vehicles for invalids. To this end, and in contrast to what is shown in FIG. 2, the line 24 can be connected to the input 32 and the line 26 to the input 31.

Referring to FIG. 2, a control element—a prestressed compression spring 9 in the drawing—biases the piston 8 towards the chamber 35b in a normal position near inlet 32 and the outlet 34; in this normal position each of the two brake systems 12, 13 can be operated selectively by the associated actuators 14, 15, respectively. When the pressure acting on the piston 8 and opposing the spring 9 exceeds the biasing provided thereby, the piston 8 moves from the normal position shown further into the chamber 35a and pressure medium is displaced therefrom into the line 19, so that the front brake system 12 can be operated together with the rear system 13 by way of the pedal 25. Instead of a compression spring some other control element can be provided, such as a diaphragm which acts directly or by way of a fluid or mechanical connection to control the position of the piston 8.

The inlet 31 is closable by a needle valve 10 which is disposed in the body 30 and which comprises a guide piston 37 guided sealingly in a bore 36 in the body 30, the needle valve 10 having a moving member 38 which can be engaged with a valve seat against the force of a return spring 40 and which is movable between a closed position closing the inlet 31 and an open position opening the same. The bore 36 communicates with the chamber 35b by way of a duct 39 via which the piston 35 can be energized in the sense of a closing movement of the needle valve 10.

Normal braking with the brake device according to the invention proceeds as follows: as a result of pedal pressure the foot brake cylinder 4 builds up pressure in the line 26 to the coupler 5 and operates the rear wheel brake 2. Via the connection to the isolating piston 8 and to the needle valve 10 pressure also builds up in the coupler 5. The needle valve 10 closes the line 24 to the hand brake cylinder 3. When the pressure acting on the isolating piston 8 exceeds the biasing provided by the spring 9 the piston 8 starts to move from its end position against the force of the spring 9 and compresses the same. The fluid displaced as a result is forced, since the needle valve 10 is in the closed state, to the front wheel brakes 1, 1a and produces an application thereof.

By action on the design of the control element and on the size of the stroke and bore of the isolating piston 8, in the brake device according to the invention a delay of front wheel braking and the front-to-rear braking force relationships can be so controlled in dependence upon foot brake pressure that the alteration in wheel loading caused by displacement of vehicle weight is compensated for by an adapted braking force. Very conveniently, the braking force of the rear wheel for the variable wheel load is above the optimal level and the braking force of the front wheel is below the optimum level. This means that the rear wheel locks first and warns the driver of imminent overbraking of the front wheel with the risk of falling.

One particular advantage of the coupling according to the invention between the two systems 12, 13 is that the driver can produce maximum braking by operation of just a single pedal 25, simultaneous operation of the hand brake being unnecessary. Also, there is as in four-wheel vehicles a direct relationship between pedal force and delay, so that a braking force amplifier 11 can, if required, be used for the foot brake cylinder 4 without any risk of an incorrect locking sequence. The brake device according to the invention can also be amplified by just two anti-locking devices 6, 7 as compared with the three or more such units required for full anti-locking protection in conventional single-track interlinked devices.

The brake device according to the invention is very advantageous in the event of defects. Should the foot brake cylinder 4 or the lines 22, 26 to the rear wheel brake 2 or the brake 2 itself become defective, the front brakes 1, 1a can be used completely independently by means of the hand brake since the piston 8 when in its normal position isolates the systems 12 and 13 from one another, the open needle valve 10 permits an unhampered buildup of pressure in the front system 12, and the anti-lock device 6 operates unimpaired.

In the event of a defect occurring in the hand brake cylinder 3 or in the lines 19, 24 to the front wheel brakes 1, 1a or to the front wheel brakes themselves, pedal pressure produces an initial buildup of pressure in the rear system 13 in accordance with the force of the pressure-distributing spring 9. The piston 8 moves against the spring 9. Very advantageously, the volume of the foot brake cylinder 4 is adapted to the maximum displacement volume of the piston 8 so that it reaches its other end position at approximately 75% of maximum pedal movement. When this occurs pressure in the rear system 13 rises as the pedal 25 is further depressed until the maximum braking force is reached—i.e. the rear system 13 operates, but with further pedal travel, unaffected by the defective system 12. The driver will immediately recognize both disturbances, viz. by a soft pedal 25 in the event of failure of the rear system 13 and by a long pedal travel and reduced braking effect in the event of failure of the front system 12, simultaneously with a soft lever 25.

Figure 3:
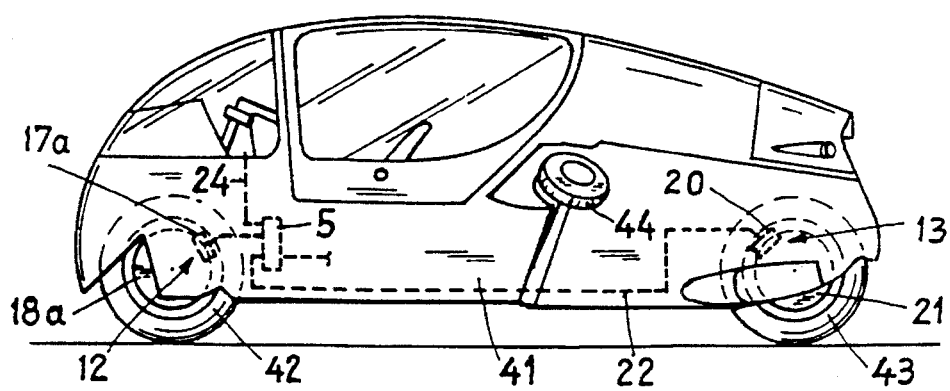
FIG. 3 is a view in side elevation of a single-track vehicle which has a brake device according to the invention.

The single-track vehicle shown in FIG. 3, in the form of an enclosed motorcycle having bodywork 41, a front wheel 42, a rear wheel 43 and outwardly pivotable support rollers 44, comprises a brake device according to the invention of which some parts hereinbefore described are shown in the drawing.

The brake device according to the invention is also of use for other single-track vehicles of any kind, e.g. conventional motorcycles or muscle-powered vehicles. Also, the construction according to the invention is suitable for pneumatic brake systems.

What is claimed is:

1. A fluid interlinked brake device for a single-track vehicle having first and second brake systems, one associated with a front wheel and one associated with a rear wheel of the vehicle, each brake system comprising at least one brake unit and an independent actuator operatively coupled with the brake unit, a coupler operatively connecting the first and second brake systems and including first and second pressure medium ducts which are fluidly isolated from one another and which are each adapted to be fluidly connected to the actuator of the respective brake systems, and a movable connecting part actuatable by pressurized medium in the ducts for coupling the first and second brake systems to permit actuation of the corresponding brake units by one of the actuators in response to a movement of the connecting part induced by the pressurized medium in one of the ducts.

2. A brake device according to claim 1 wherein the coupler comprises a valve having an inlet for each of the actuators, an outlet for each of the brake units, and a bore defining the pressure medium ducts and interconnecting the inlets and outlets, the connecting part being a piston sealingly movable in the bore and fluidly separating the first and second pressure medium ducts in the bore, the connecting part being movable between a normal position permitting selective operation of each of the brake units with its associated actuator and an offset position in which activation of one of the brake units with its associated actuator results in the activation of the other one of the brake units.

3. A brake device according to claim 1 wherein the coupler comprises a control element which is engageable with the connecting part and which opposes an actuating force generated by the connecting part when subjected to the pressure medium in one of the pressure medium ducts with a biasing force which corresponds to a predetermined braking force generated by the brake unit connected to the one pressure medium duct so that an actuating force generated by the connecting part which exceeds the biasing force causes movement of the connecting part towards another one of the pressure medium ducts and thereby subjects the brake unit associated with the other duct to pressurized medium.

4. A brake device according to claim 3, wherein one of the brake units generates a braking force of a predetermined value which effects maximum deceleration of the vehicle, and wherein the biasing force generated by the control element corresponds to a braking force which exceeds the predetermined value thereof.

5. A brake device according to claim 3 wherein the brake units fluidly connected to the one duct generate a braking force of a predetermined value which effects maximum deceleration of the vehicle, and wherein the pressure medium in the other duct produces an actuating force effective in the brake unit associated with the other duct which is less than the predetermined value.

6. A brake device according to claim 3 including a further valve in fluid communication with the one pressure medium duct and the actuator associated therewith, the further valve having a valve seat and a valve member, the valve member being movable into and out of engagement with the valve seat between a closed position shutting off fluid connection between the actuator and the one duct and an open position opening the fluid connection between the actuator of the one duct in response to the application of a predetermined force to the valve member.

7. A brake device according to claim 6 wherein the coupler includes a piston bore and a piston part reciprocably movable in the piston bore and operatively coupled to the valve member for causing movement of the valve member with the piston part, and wherein the piston bore is in fluid communication with the other pressure medium duct for movement of the piston part and the valve member with pressure medium from the other pressure medium duct.

8. A brake device according to claim 1 wherein at least one of the actuators comprises a unit for amplifying an actuating force generated by the at least one actuator.

9. A brake device according to claim 1 wherein at least one of the brake systems comprises a device operatively connected with the coupler and the brake unit of the at least one brake system preventing a locking of the brake unit.

10. A single-track vehicle comprising a frame and a brake device mounted on the frame, the brake device including first and second brake systems, one associated with a front wheel and one associated with a rear wheel of the vehicle, each brake system comprising at least one brake unit and an independent actuator operatively coupled with the brake unit, a coupler operatively connecting the first and second brake systems and including first and second pressure medium ducts which are fluidly isolated from one another and which are each adapted to be fluidly connected to the actuator of the respective brake systems, and a movable connecting part actuatable by pressurized medium in the ducts for coupling the first and second brake systems to permit actuation of the corresponding brake units by one of the actuators in response to a movement of the connecting part induced by the pressurized medium in one of the ducts.

* * * * *